United States Patent [19]

Prestridge et al.

[11] 4,400,253

[45] Aug. 23, 1983

[54] VOLTAGE CONTROL SYSTEM FOR ELECTROSTATIC OIL TREATER

[75] Inventors: Floyd L. Prestridge, Mounds, Okla.; Adolph A. Schuetz; Harry L Wheeler, both of Birmingham, Ala.

[73] Assignee: Combustion Engineering, Inc., Windsor, Conn.

[21] Appl. No.: 442,209

[22] PCT Filed: Aug. 9, 1982

[86] PCT No.: PCT/US82/01079

§ 371 Date: Sep. 30, 1982

§ 102(e) Date: Sep. 30, 1982

[51] Int. Cl.³ .................... B01D 17/06; C10G 33/02
[52] U.S. Cl. ................................... 204/186; 204/305
[58] Field of Search ................. 204/186, 188, 191, 305

[56] References Cited

U.S. PATENT DOCUMENTS

| | | | |
|---|---|---|---|
| 3,446,724 | 5/1969 | Winslow, Jr. | 204/191 |
| 3,519,550 | 7/1970 | Winslow, Jr. | 204/305 |
| 3,532,614 | 10/1970 | Shirley | 204/191 |
| 3,644,187 | 2/1972 | Wilson | 204/305 |
| 3,939,395 | 2/1976 | Prestridge | 204/305 |
| 4,204,934 | 5/1980 | Warren | 204/186 |

*Primary Examiner*—T. M. Tufariello
*Attorney, Agent, or Firm*—David L. Smith

[57] ABSTRACT

An automatic voltage control system controls the firing angle of a solid state switch (20), in turn the voltage applied to the primary winding (12) of a step-up transformer (10), in turn the voltage applied to the grid (38) and in turn the electric field intensity between grid elements (38) in an electrostatic separation process. Two voltage control signals are generated in the control system. The first voltage control signal is a protective control signal generated to maximize the voltage applied to the primary winding under normal operating conditions and to reduce the voltage to zero for a short time period following abnormal operating conditions then to reapply voltage to the primary winding (12) again. The second voltage control signal is a periodic signal of adjustable rate and frequency that functions as a variable upper limit to the magnitude of the first control signal. The first control signal as limited in magnitude by the second control signal controls the firing angle of a solid state switch (20), in turn the voltage applied to primary winding (12) and in turn the electric field intensity between grid elements (38). The electric field intensity increases then decreases periodically to coalesce small droplets of a first fluid dispersed throughout a second fluid into larger droplets. During the increase in electric field intensity, small droplets of the first fluid are coalesced into larger droplets. The decrease in electric field intensity encourages continued coalescence of larger droplets. Any droplets not coalesced during a given cycle of field intensity are subjected to subsequent periodic variations in field intensity as the electrostatic separation process through flow is continuous and the electrostatic field intensity variation is repetitive.

18 Claims, 5 Drawing Figures

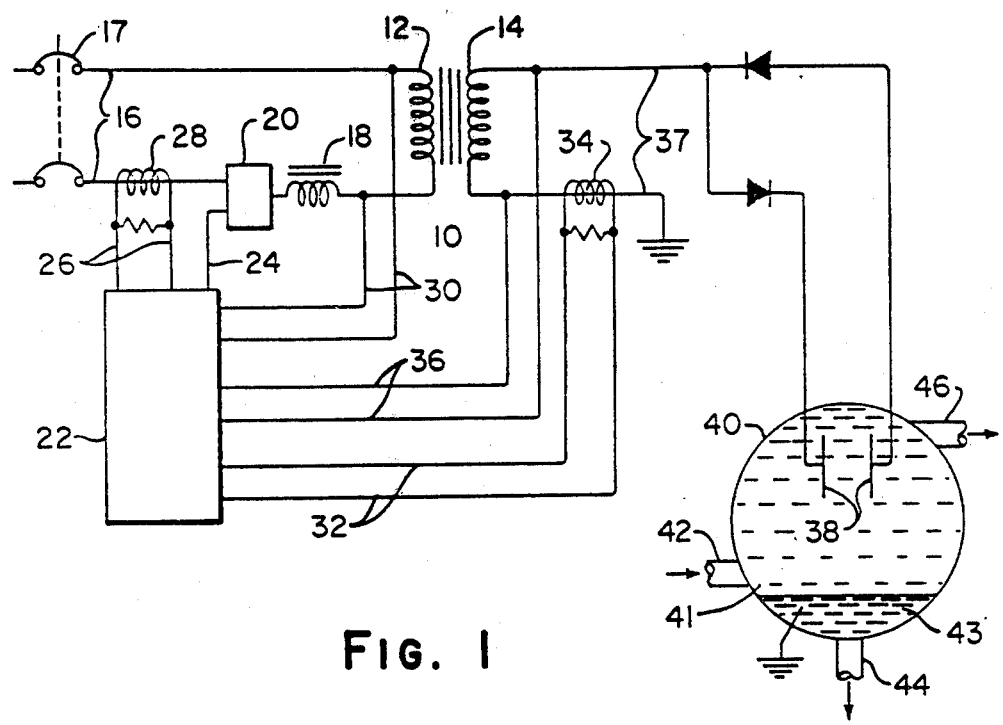
Fig. 1
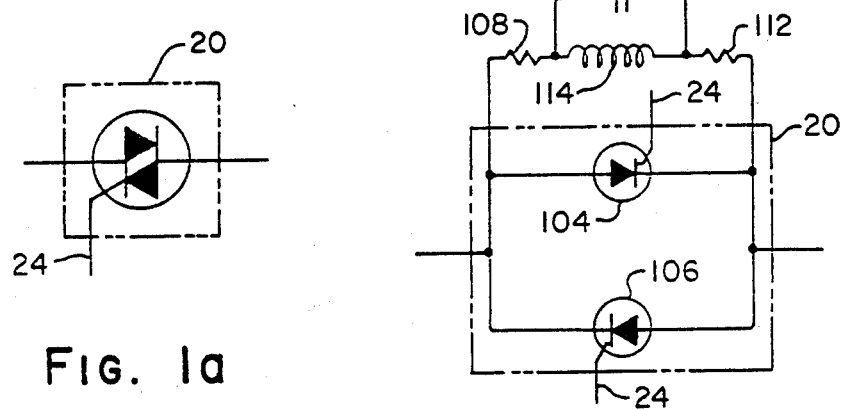
Fig. 1a
Fig. 1b

VOLTAGE CONTROL SYSTEM FOR ELECTROSTATIC OIL TREATER

BACKGROUND OF THE INVENTION

This invention relates to controlling the intensity of the electric field in an electrostatic separation process and in particular to a voltage control system for controlling the intensity of the electric field when removing water from an emulsion of oil and water in an electrostatic oil dehydrater.

Separation processes utilizing high voltage electric fields include solid-solid separation in the benefaction of ores, solid or liquid separation from a dielectric liquid, and the use of electrostatic precipitators to remove solid or liquid particles from exhaust gases and air conditioning systems. The electrostatic field utilized in these separation processes is generated by applying an alternating current voltage, a direct current voltage, or some combination thereof, to a grid within the process flow.

When the liquid-liquid separation removes water from an oil-water emulsion in an electrostatic dehydrater, the oil acts as a dielectric and water droplets are coalesced. Coalescence occurs when small water droplets collide and unite to form larger water droplets. Water droplets are coalesced by establishing an electric field between grid elements and passing the oil-water emulsion through the electric field. Since water is slightly polar, it will move toward the oppositely charged grid element, coalesce and gravitate to the bottom of the dehydrater where the water is removed.

Small water droplets have a low settling velocity and therefor gravitate slowly or are carried along with the through flow. It is desirable to cause small water droplets to coalesce to form larger water droplets since the larger water droplets gravitate more readily. Small water droplets, however, are more difficult to move through oil and therefore require more power to coalesce. Specifically, to coalesce small water droplets, an intense electric field such as is achieved when a high voltage is applied to the grid elements is required. A problem arises in maintaining a high voltage applied to the grid elements in that during the coalescence process eventually the water droplets become sufficiently large that the high voltage operates detrimentally to the coalescence process by shearing the larger water droplets into smaller water droplets.

U.S. Pat. No. 4,204,934 addresses this problem. In FIG. 2 an arrangement is disclosed wherein a larger voltage is applied to grid element 22 than is applied to grid element 23 creating a higher electric field intensity between grid element 22 and ground element 21 than between grid element 23 and ground element 21. The through flow first passes through the higher intensity electric field to coalesce small water droplets then through the lower intensity electric field to continue the coalescence process without shearing the larger coalesced droplets. FIG. 3 discloses an alternate arrangement wherein the same voltage is applied to grid elements at different physical distances from ground thereby creating a higher electric field intensity between the closer spaced grid element and ground while establishing a lower electric field intensity between the more distant spaced grid element and ground. Again the through flow first passes through the higher intensity electric field to coalesce small droplets then through the lower intensity electric field to continue the coalescence process without shearing the larger coalesced droplets. FIG. 4 discloses yet another arrangement wherein a voltage is applied to a single grid element with non-uniform physical spacing between the grid element and electrical ground. The through flow first passes through a low intensity electric field where the grid element and electric ground are spaced apart, then through a high intensity electric field where the grid element and electrical ground converge toward each other and finally through a decreasing intensity electric field where the grid element and electrical ground diverge.

What is needed is a method and apparatus for varying the electric field intensity between grid elements in an electrostatic separation process that would subject through flow to a high electric field intensity to coalesce small water droplets followed by a lower electric field intensity to reduce the shear forces to which the coalesced water droplets are exposed so that coalescence of larger water droplets continues without rupturing. Such a method and apparatus would be more flexible than the physical arrangement of grids and could be adjusted for the specific application to enhance the separation process.

SUMMARY OF THE INVENTION

The present invention provides a method and apparatus for varying in a controlled manner the electric field intensity through which the through flow passes in an electrostatic separation process by periodically varying the voltage applied to the grid. A voltage controller is utilized to generate a first control signal to maximize the voltage applied to the primary winding of a step-up transformer and to protect the step-up transformer from exceeding rated power during arcing or the occurrence of a low resistance path between opposite polarity grid elements. A second control signal generates a periodic wave form that increases then decreases in magnitude and functions as a variable upper limit to the magnitude of the first control signal. The protective control signal as limited in magnitude by the periodic control signal controls the firing angle of a solid state switch and in turn the voltage applied to the primary winding of the step-up transformer. Since the secondary winding of the step-up transformer energizes the grid of the electrostatic separation process, controlling the firing angle of the solid state switch is effective to control the intensity of the electric field through which the through flow passes. Coalescence of small water droplets is enhanced during the increase in electric field intensity; the electric field intensity is then decreased so as not to rupture the larger coalesced water droplets while continuing to coalesce the larger water droplets. As through flow passes through the electric field, it is subjected to one or more cycles of the controlled electric field intensity.

BRIEF DESCRIPTION OF THE DRAWING

FIG. 1 is a schematic diagram of the voltage control system and separation process embodying the present invention;

FIGS. 1a and 1b are schematic diagrams of alternate embodiments of the solid state switch of FIG. 1;

DESCRIPTION OF THE PREFERRED EMBODIMENT

Figure 2:
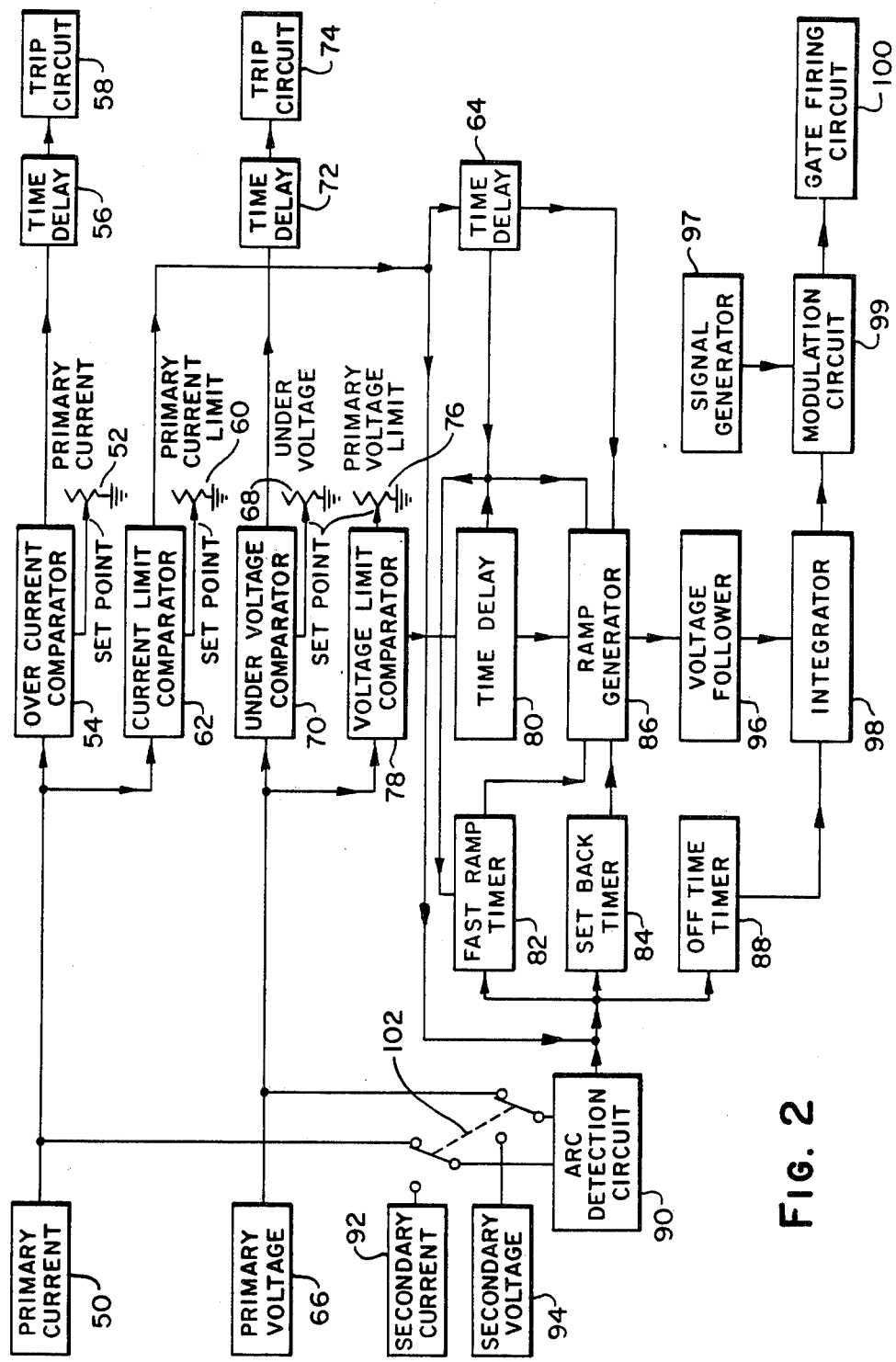
FIG. 2 is a block diagram showing the voltage control circuit in more detail.

Referring to the drawing, there is depicted therein an automatic voltage control system designed in accordance with the present invention as best seen schematically in FIG. 1. Step-up transformer 10 is comprised of primary winding 12 and secondary winding 14. Primary winding 12 is connected across an alternating current voltage source by leads 16. In series with primary winding 12 is reactive impedance 18 which upon a short circuit across secondary winding 14 limits the current passing through primary winding 12 but since reactive impedance 18 is less than a 100% reactive impedance, reactive impedance 18 does not limit the current passing through primary winding 12 to less than rated current. Solid state switch 20 also in series with primary winding 12 controls the voltage applied to primary winding 12. Solid state switch 20 is turned on by voltage control and gate firing circuit 22 through conductor 24. Voltage control and gate firing circuit 22 senses primary winding 12 current through leads 26 and current transformer 28 in addition to primary winding 12 voltage through leads 30. Voltage control and gate firing circuit 22 senses secondary current through leads 32 and current transformer 34 in addition to secondary winding 14 voltage through leads 36.

Secondary winding 14 is connected by leads 37 to grid elements 38 of oil dehydrater 40 wherein the dehydration process occurs. The voltage applied to grid elements 38 can be an alternating current voltage, a direct current voltage or, as shown in FIG. 1, a combination of alternating current and direct current voltage. The oil-water 41 emulsion enters dehydrater 40 at port 42. The water removed in the dehydration process forms a body of water 43 at the bottom of dehydrater 40, is discharged from dehydrater 40 at port 44 and the dehydrated oil exits from dehydrater 40 at port 46.

As shown in FIG. 1a, solid state switch 20 may be a triac. FIG. 1b shows an alternate embodiment wherein solid state switch 20 is comprised of silicon controlled rectifiers (SCR) 104 and 106. When solid state switch 20 is comprised of inverse SCR's 104 and 106, a circuit to detect that one of the SCR's has failed open is included. As seen in FIG. 1b, resistor 108 is connected between the cathode of SCR 104 and the first lead of dc relay coil 114. Resistor 112 is connected between the cathode of SCR 106 and the second lead of coil 114. Capacitor 110 is connected in parallel with coil 114. The SCR failure detection circuit under normal operating conditions passes current through resistor 108, capacitor 110 and resistor 112 during one half-cycle of the applied voltage and back through the same components during the subsequent half-cycle. Capacitor 110 charges in one direction, then discharges and charges in the opposite direction such that capacitor 110 acts as a short circuit during normal operation and functions to pass current around coil 114 leaving coil 114 deenergized.

Upon failure of SCR 104 or 106, a dc current passes in one direction through resistor 108, coil 114 and resistor 112. Under a failed SCR condition, capacitor 110 charges and blocks further current flow through capacitor 110 and causes coil 114 to energize. Coil 114 upon energizing closes an alarm circuit indicating one of the SCR's has failed.

Voltage control and gate firing circuit 22 generates a gate triggering signal in the range of 2–10 volts to trigger solid state switch 20 to control the voltage applied to primary winding 12. The gate signal is comprised of a protective control signal that is limited in magnitude by a periodic wave form such as a triangular wave or a sawtoothed wave which causes the firing angle to vary periodically. The voltage applied to primary winding 12 then in turn varies periodically to cause the electric field intensity to increase thereby enhancing coalescence of small water droplets and then to decrease so as not to rupture the larger coalesced water droplets while continuing to coalesce the larger water droplets. Through flow passing through the electric field is subjected to one or more cycles of the varying field intensity. The field intensity is variable from less than one cycle per second to several cycles per second.

Coalescence occurs when small water droplets collide and unite to form larger water droplets. Water droplets are coalesced by establishing an electric field between grid elements 38 and passing the oil-water emulsion through the electric field. Since water is slightly polar, it will move toward the oppositely charged grid elements 38, coalesce and gravitate to the bottom of dehydrater 40 where water is removed through port 44.

Small water droplets have a low settling velocity and therefore gravitate slowly or are carried along with the through flow. It is desirable to cause small water droplets to coalesce to form larger water droplets since the larger water droplets gravitate more readily. To coalesce small water droplets, an intense electric field is required as is achieved when a high voltage is applied to grid elements 38. A high voltage is detrimental to the coalescene of larger water droplets because the high voltage causes large shear forces which rupture larger water droplets forming smaller water droplets. This is just the opposite of the desired effect.

A high electric field intensity is desired to coalesce small water droplets into larger water droplets followed by a lower electric field intensity to reduce shear forces to which water droplets are exposed so that coalescence of the larger droplets continues without rupturing. An effective means of varying the electric field intensity is to vary the voltage applied to grid 38. The voltage applied to grid 38 is varied by varying the voltage applied to primary winding 12 which in turn is varied by controlling the firing angle at which solid state switch 20 is triggered. Voltage control and gate firing circuit 22 controls the firing angle at which solid state switch 20 is triggered.

FIG. 2 shows the voltage control and gate firing circuit 22 of FIG. 1 in block diagram form. Primary current 50 is a recitifed signal representing the primary current measured by current transformer 28. Primary current 50 is compared to primary over current set point 52 in overcurrent comparator 54. When primary current 50 exceeds primary over current set point 52, time delay 56 is energized and if an over current condition still exists time delay 56 times out, trip circuit 58 is energized indicating an over current exits in primary winding 12. Time delay 56 filters out the otherwise nuisance trips due to transient over current conditions of short duration. Trip circuit 58 energizes a coil that opens circuit breaker 17 to protect transformer 10. Trip circuit 58 is a back-up to the voltage control system for protecting transformer 10.

Primary current 50 is also compared to primary current limit set point 60 in current limit comparator 62. When primary current 50 exceeds primary current limit set point 60, current limit comparator 62 resets time delay 64. When primary current 50 exceeds primary current limit set point 60, current limit comparator 62 also resets fast ramp timer 82, set back timer 84 and off-time timer 88 resulting in the same control action as if arc detection circuit 90 had detected an arc with the exception that after off-time timer 88 has timed out and primary voltage 66 has recovered to a reduced value, primary voltage is maintained constant by disabling ramp generator 86 until time delay 64 times out. The control action that follows arc detection is described below.

Primary voltage 66 is a rectified signal representing the voltage measured across primary winding 12. Primary voltage 66 is compared to under voltage set point 68 in under voltage comparator 70. When primary voltage 66 is less than under voltage set point 68, under voltage comparator 70 energizes time delay 72. If an under voltage condition still exists then time delay 72 times out, trip circuit 74 is energized indicating an under voltage condition exists in primary winding 12. The time delay 72 filters out the otherwise nuisance trips due to transient over voltage conditions of short duration. Trip circuit 74 energizes a coil that opens circuit breaker 17 to protect transformer 10. Trip circuit 74 is a back-up to the voltage control system for protecting transformer 10.

Primary voltage 66 is also compared to primary voltage limit set point 76 in voltage limit comparator 78. When primary voltage 66 equals the primary voltage limit set point 76, voltage limit comparator 78 energizes time delay 80. Time delay 80 filters out the apparent overvoltage condition due to the ripple remaining on primary voltage 66. During the time delay period, the ramp generator control signal is slightly reduced and when time delay 80 times out, the firing angle of solid state switch 20 and in turn the voltage applied to primary winding 12 is maintained at or below the limit set point by disabling ramp generator 86 and fast ramp timer 82 until either a current limit is reached or an arc is detected.

Arc detection circuit 90 has inputs of primary current 50 and primary voltage 66 or secondary current 92 and secondary voltage 94 as determined by the position of switch 102. Although primary current 50 and primary voltage 66 are preferred, secondary current 92 and secondary voltage 94 can be used for arc detection. During arcing, step-up transformer 10 secondary voltage decreases essentially to zero; step-up transformer 10 primary voltage decreases to the impedance voltage of primary winding 12. Primary and secondary current increase to several times their normal operating values. Upon the detection of an arc, arc detection circuit 90 resets fast ramp timer 82, set back timer 84 and off-time timer 88. Thus, both arc detection and over current resets fast ramp timer 82, set back timer 84 and off-time timer 88.

For the duration of off-time timer 88 timing, gate firing circuit 100 inhibits solid state switch 20 from firing resulting in primary voltage 66 decreasing to zero. Off-time timer 88 has an adjustable time setting. The minimum setting of off-time timer 88 is the time setting of set back timer 84 but will usually be larger, up to approximately 40 milliseconds.

For the duration of set back timer 84 timing, the voltage level retained by voltage follower 96 is slowly decreased. The rate of reduction is adjustable as is the time setting of set back timer 84. The voltage level reduced is the rate of reduction times the time setting of set back timer 84. The minimum set back timer 84 time setting is one-half cycle of the applied voltage frequency plus an allowance for detection of a spark at about 50% conduction angle resulting in approximately 12 milliseconds for a 60 hertz application. Thus, when off-time timer 88 times out, the firing angle of solid state switch 20 will increase exponentially from zero to the voltage level then currently retained by voltage follower 96 and integrator 98, which is a level less than the voltage level at which the arc or overcurrent occurred.

For the duration of fast ramp timer 82, the voltage control system controls the voltage applied to primary winding 12 as described above. Upon fast ramp timer 82 timing out, the firing angle of solid state switch 20 and hence the voltage applied to primary winding 12 is increased at an adjustably rapid rate until a voltage limit, a current limit or an arc occurs. Fast ramp timer 82 timing out indicates that the power delivered to dehydrater 40 has been too low for an extended time period. Fast ramp timer 82, set at approximately 15 seconds, avoids a prolonged low power condition. Fast ramp timer 82 is reset each time a current limit or arc is detected. Fast ramp timer 82 is disabled when the voltage applied to primary winding 12 reaches primary voltage limit set point 76 and the firing angle of solid state switch 20 remains constant until a current limit or arc occurs.

The output of integrator 98 is a first control signal, which if applied to gate firing circuit 100 would produce the voltage control function described above. Signal generator 97 produces a second control signal that is a periodic wave form, which if applied to gate firing circuit 100 would cause the voltage applied to primary winding 12 to vary as the signal generator 97 output varies. Signal generator 97 produces positive or negative half-cycle periodic wave forms depending upon whether an inverting amplifier is used in a voltage range compatible to operate gate firing circuit 100. The rate, frequency and magnitude of the periodic wave forms can be adjusted. Signal generator 97 produces, for example, triangular waves or sawtooth waves.

The voltage control signal output of integrator 98 is magnitude limited by signal generator 97 output in modulation circuit 99. The magnitude limited signal is the triggering signal applied to gate firing circuit 100. The magnitude limited signal controls the firing angle of solid state switch 20 to control the voltage applied to primary winding 12 and in turn the electric field intensity. When a voltage limiting condition has occurred in the first control signal, the triggering signal follows the second control signal.

Figure 3:
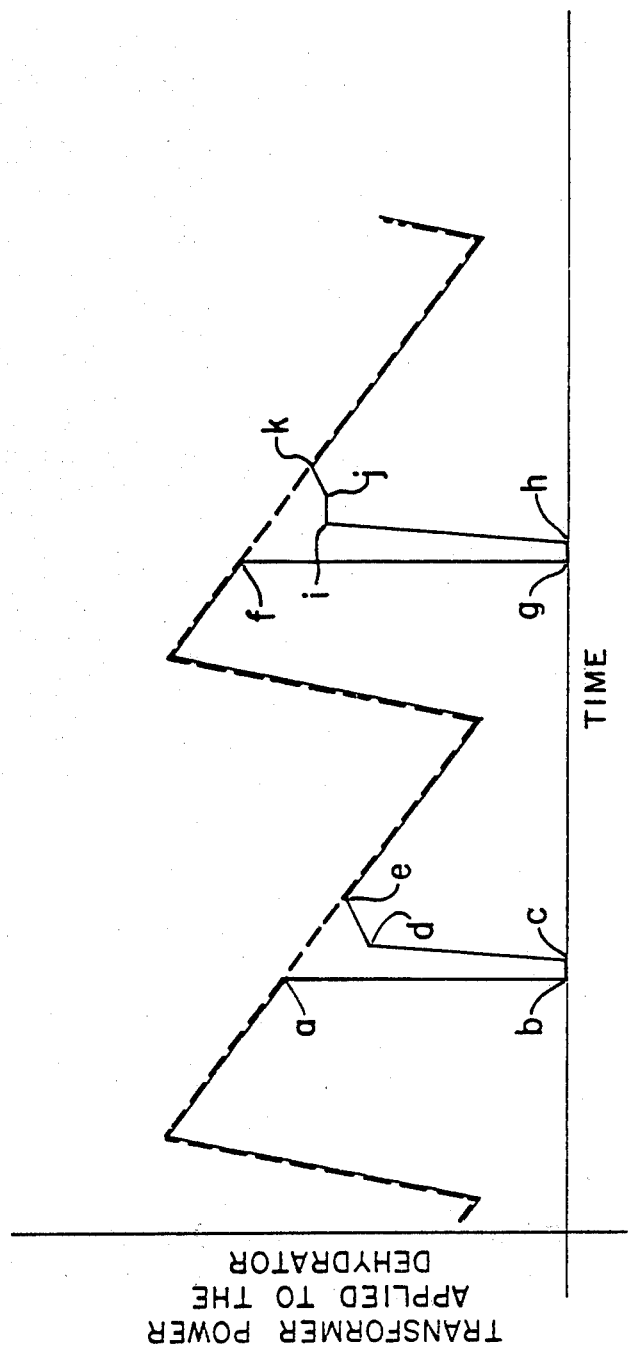
FIG. 3 shows the power applied to the separation process under various operating conditions.

The power delivered to dehydrater 40 under typical operating conditions is shown as FIG. 3 with signal generator 97 producing a triangular wave form that would produce a primary voltage shown as a broken line. The power delivered by step-up transformer 10 is shown at point a as being reduced to zero at point b due to arcing. At that time, fast ramp timer 82, set back timer 84, and off-time timer 88 are reset. During timing of off-time timer 88, the power delivered to dehydrater 40 by set-up transformer 10 is maintained at zero value by off-time timer 88 maintaining solid state switch 20 in the off state. Solid state switch 20 is maintained in the off state by controlling gate firing circuit 100 such that solid state switch 20 does not turn on. After off-time timer 88 has timed out at point c, voltage is again applied to primary winding 12 of step-up transformer 10; ramp generator 86 causes gate firing circuit 100 to turn solid state switch 20 on to increase the voltage applied to step-up transformer 10 and hence the power applied to dehydrater 40. Voltage rises exponentially to point d of FIG. 3. The transformer voltage applied to dehydrater 40 at point d is less than the voltage at point a as determined by ramp generator 86. During the timing of off-time timer 88, voltage follower 96, which had been following the voltage applied to primary winding 12, is permitted to dissipate some energy so that when voltage is reapplied to primary winding 12 it is reapplied at a voltage level below the level where the arc occurred. Once the power applied to dehydrater 40 has reached the level of point d, it is increased at a slow ramp rate as determined by integrator 98 until a voltage limit condition, an arc, or a current limit condition arises or until fast ramp timer 82 has timed out.

Point e shows that when the power level reaches the level that would be supplied when the first control signal was limited by the second control signal, the power level is limited by the second control signal. The power level is shown as following the power level as limited by the second control signal through point f.

At point f, another protective function of the first control signal is shown. If the limiting condition is a current limit as shown at point f, the power delivered to dehydrater 40 is reduced to zero at point g simultaneously with resetting fast ramp timer 82, set back timer 84, off-time timer 88 and time delay 64. The power delivered to dehydrater 40 remains at zero for the duration of off-time timer 88 between point g and point h. During the timing of off-time timer 88, voltage follower 96, which had been following voltage applied to primary winding 12, is permitted to dissipate some energy so that when voltage is reapplied to primary winding 12 it is reapplied at a voltage level below the level where the current limit occurred. At point h, ramp generator 86 again exponentially increases the voltage applied to dehydrater 40 to a point i which is lower than the voltage delivered at point f where the current limit occurred. The voltage remains constant at the level of point i until time delay 64 times out at point j. The voltage is then increased at the slow ramp rate until a voltage limit condition, an arc or current limit condition arises, or until fast ramp timer 82 has timed out.

Point k shows that when the power level again reaches the level that would be supplied when the first control signal was limited by the second control signal, the power level is again limited by the second control signal.

It is to be understood that FIG. 3 is illustrative and that power variations may occur several times within the periodic envelope. The frequency and order of power variations would be determined by the conditions encountered in operation. The power level supplied to dehydrater 40 generally follows the level as controlled by the second control signal. The power level deviates from the level of the second control signal when necessary to protect step-up transformer 10 or eliminate an undesirable operating condition, only to return to follow the periodic power variations as controlled by the second control signal.

We claim:

1. In an electrostatic separation process, an automatic voltage control system for coalescing a first fluid which is dispersed throughout a second fluid by controlling the voltage applied to the primary winding of the step-up transformer, the secondary winding thereof energizes the grid of the electrostatic separation process, comprising:

(a) the step-up transformer having a primary winding and a secondary winding with the primary winding connected to an alternating current voltage source and the secondary winding connected across the grid of the electrostatic separator;
   (b) means for measuring the current passing through the primary winding of the step-up transformer;
   (c) means for measuring the voltage across the primary winding of the step-up transformer;
   (d) a solid state switch in series with the primary winding of the transformer;
   (e) means responsive to the current measured by the current measuring means and responsive to the voltage measured by the voltage measuring means for detecting an arcing condition;
   (f) means for comparing the current passing through the primary winding as measured by the current measuring means to a predetermined first primary current limit set point, the comparing means having a first input port for receiving the measured primary current from the primary current measuring means, a second input port for receiving the first primary current limit set point and an output port at which the compared current signal is presented;
   (g) voltage control circuit means responsive to the compared current signal and responsive to the voltage measured by the voltage measuring means for generating a first control signal to switch the solid state switch on to control the magnitude of the voltage applied to the primary winding of the step-up transformer;
   (h) voltage control circuit means for generating a periodic second control signal to switch the solid state switch on to control the magnitude of the voltage applied to the primary winding of the step-up transformer;
   (i) circuit means for limiting the magnitude of the first control signal by the magnitude of the second control signal producing a magnitude controlled triggering signal; and
   (j) circuit means for applying the magnitude controlled triggering signal to trigger the solid state switch, whereby the voltage applied to the grid and in turn the electric field intensity between grid elements increases then decreases periodically and within the limit of the periodically increasing then decreasing voltage the automatic voltage control system reduces the voltage applied to the grid to zero temporarily upon detecting an arcing condition or a primary current limit has been reached.

2. An automatic voltage control system as recited in claim 1, wherein the voltage control circuit means for generating a first control signal temporarily inhibits the solid state switch from triggering upon detecting an arcing condition.

3. An automatic voltage control system as recited in claim 1 wherein the voltage control circuit means for generating a first control signal temporarily inhibits the solid state switch from triggering upon detecting a primary current limit has been reached.

4. An automatic voltage control system as recited in claim 2 or 3 wherein means for generating a first control signal to switch the solid state switch on following temporarily inhibiting the solid state switch from triggering further comprises means for applying voltage to the primary winding at a voltage level below the voltage level prior to temporarily inhibiting the solid state switch from triggering.

5. An automatic voltage control system as recited in claim 1 wherein means for generating a first control signal to switch the solid state switch on further comprises means for increasing the voltage applied to the primary winding at a predetermined rate.

6. An automatic voltage control system as recited in claim 1 further comprising a reactive impedence in series with the primary winding of the step-up transformer.

7. An automatic voltage control system as recited in claim 6 wherein the reactive impedance is less than a 100% reactive impedance.

8. An automatic voltage control system as recited in claim 1 or 6 wherein the solid state switch is a triac.

9. An automatic voltage control system as recited in claim 1 or 6 wherein the solid-state switch is comprised of inverse silicon controlled rectifiers.

10. An automatic voltage control system as recited in claim 9 further comprising means for detecting the open circuit failure of one of the silicon controlled rectifiers.

11. An automatic voltage control system as recited in claim 9 further comprising means for interrupting power to the primary winding of the step-up transformer upon detection of the open circuit failure of one of the inverse silicon controlled rectifiers.

12. An automatic voltage control system as recited in claim 1 wherein the voltage control circuit further comprises:
 (a) means for comparing the current passing through the primary winding as measured by the current measuring means to a second predetermined primary current set point, the second primary current set point having a magnitude greater than the first primary current set point, the comparing means having a first input port for receiving the measured primary current, a second input port for receiving the second primary current set point and an output port at which the compared current signal is presented; and
 (b) means responsive to the compared current signal for interrupting the power to the primary winding of the step-up transformer upon detecting primary current exceeds the second primary current set point.

13. An automatic voltage control system as recited in claim 1 wherein the voltage control circuit further comprises:
 (a) means for comparing the voltage across the primary winding of the step-up transformer as measured by the voltage measuring means to a predetermined under voltage set point, the comparing means having a first input port for receiving the measured primary voltage, a second input port for receiving the under voltage set point, and an output port at which the compared voltage signal is presented; and
 (b) means responsive to the compared voltage signal for interrupting the power to the primary winding of the step-up transformer upon detecting primary voltage below the under voltage set point.

14. In an electrostatic separation process, a method of coalescing a first fluid which is dispersed throughout a second fluid, comprising:
 (a) passing a mixture of the second fluid and first fluid dispersed throughout the second fluid through an electrostatic field;
 (b) generating the electrostatic field by applying to a grid submerged in the second fluid a voltage generated by an automatic voltage control system that maximizes the voltage applied to the grid up to a voltage limit and temporarily interrupts the voltage applied to the grid upon an abnormal operating condition;
 (c) periodically changing the voltage limit by increasing, then decreasing the voltage limit to further enhance coalescense of small droplets of the first fluid into larger droplets during the increase in voltage limit and not to rupture larger droplets once coalesced by decreasing the voltage limit and to encourage continued coalescence of larger droplets during the decrease in voltage;
 (d) forming a body of the first fluid coalesced by the electrostatic field and gravitated below the grid;
 (e) withdrawing the first fluid from the body; and
 (f) withdrawing from the electrostatic field the second fluid from which the first fluid has gravitated.

15. A method of coalescing a first fluid which is dispersed throughout a second fluid, comprising:
 (a) generating a first control signal by an automatic voltage control system that maximizes the voltage applied to a grid;
 (b) generating a second control signal that is periodic;
 (c) limiting the magnitude of the first control signal by the magnitude of the second control signal resulting in a magnitude controlled control signal;
 (d) generating an electrostatic field, the intensity of which is representative of the magnitude controlled control signal magnitude;
 (e) passing a mixture of the second fluid and first fluid dispersed throughout the second fluid through the electrostatic field;
 (f) forming a body of the first fluid colaesced by the electrostatic field and gravitated below the grid;
 (g) withdrawing the first fluid from the body; and
 (h) withdrawing from the electrostatic field the second fluid from which the first fluid has gravitated.

16. A method of coalescing a first fluid which is dispersed throughout a second fluid as recited in claim 15 wherein the step of generating a first control signal comprises:
 (a) applying a magnitude controlled alternating current voltage to the primary winding of a step-up transformer;
 (b) continuously measuring the current passing through the primary winding of the step-up transformer;
 (c) continuously measuring the voltage across the primary winding of the step-up transformer;
 (d) continually comparing the current passing through the primary winding to a first predetermined primary current limit set point;
 (e) switching the magnitude controlled alternating current voltage on to control the magnitude of the applied voltage in response to the measured current passing through the primary winding when the current passing through the primary winding does not exceed the primary current limit set point;
 (f) inhibiting the magnitude controlled alternating current voltage from switching on in response to the measured current passing through the primary winding and the measured voltage across the primary winding such that the voltage applied to the primary winding is reduced to zero following the current passing through the primary winding exceeding the primary current limit set point;

(g) maintaining the magnitude controlled alternating current voltage applied to the primary winding at zero for at least one half-cycle of the applied voltage frequency;

(h) reapplying voltage to the primary winding at a voltage level below the level where the measured current passing through the primary winding exceeded the primary current set point;

(i) continuously comparing the voltage across the primary winding to a predetermined primary voltage limit set point;

(j) increasing the voltage to the primary winding at a predetermined rate; and (k) repeating steps (e) through (j) as required.

17. A method of coalescing a first fluid which is dispersed throughout a second fluid as recited in claim 16 wherein the step of increasing the voltage applied to the primary winding at a predetermined rate comprises increasing the voltage applied to the primary winding at a predetermined rate until the first primary current limit set point is again exceeded.

18. A method of coalescing a first fluid which is dispersed throughout a second fluid as recited in claim 16 wherein the step of increasing the voltage applied to the primary winding at a predetermined rate comprises:

(a) increasing the voltage applied to the primary winding at a predetermined rate until a voltage limit is reached; and (b) maintaining the voltage applied to the primary winding at the voltage limit upon primary voltage reaching the primary voltage limit set point.

* * * * *